US012036173B1

(12) United States Patent
He

(10) Patent No.: US 12,036,173 B1
(45) Date of Patent: Jul. 16, 2024

(54) TRANSFORMABLE MASSAGER

(71) Applicant: SHENZHEN S-HANDE TECHNOLOGY CO., LTD., Shenzhen (CN)

(72) Inventor: Jing He, Shenzhen (CN)

(73) Assignee: SHENZHEN S-HANDE TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/495,005

(22) Filed: Oct. 26, 2023

Related U.S. Application Data

(63) Continuation of application No. PCT/CN2023/114851, filed on Aug. 25, 2023.

(30) Foreign Application Priority Data

Aug. 11, 2023 (CN) ........................ 202311018325.8

(51) Int. Cl.
*A61H 23/00* (2006.01)

(52) U.S. Cl.
CPC ..... *A61H 23/00* (2013.01); *A61H 2201/0107* (2013.01); *A61H 2201/0153* (2013.01); *A61H 2201/5002* (2013.01)

(58) Field of Classification Search
CPC ............ A61H 2201/0153; A61H 23/00; A61H 2201/0107; A61H 2201/5002; A61H 7/00; A61H 7/005; A61H 23/006; A61H 7/003
See application file for complete search history.

(56) References Cited

U.S. PATENT DOCUMENTS

| | | | | |
|---|---|---|---|---|
| 718,766 A * | 1/1903 | Ingram | A61H 7/00 | 601/133 |
| 8,622,890 B1 * | 1/2014 | Caggiano | A61H 19/50 | 600/38 |
| 9,737,458 B1 * | 8/2017 | Olivares | A61H 21/00 | |
| 10,080,428 B2 * | 9/2018 | Kern | A46B 13/008 | |
| 11,478,400 B1 * | 10/2022 | Marton | A61H 23/006 | |
| 2008/0306417 A1 * | 12/2008 | Imboden | A61H 21/00 | 601/134 |

(Continued)

FOREIGN PATENT DOCUMENTS

| | | |
|---|---|---|
| CN | 203089802 U | 7/2013 |
| CN | 104586619 A | 5/2015 |

(Continued)

OTHER PUBLICATIONS

Machine translation of written description and claims for CN111904825A via espacenet. (Year: 2020).*

(Continued)

*Primary Examiner* — Michael R Reid
*Assistant Examiner* — Tyler A Raubenstraw
(74) *Attorney, Agent, or Firm* — Westbridge IP LLC

(57) ABSTRACT

Disclosed is a transformable massager, including a flexible connector, a massage component and a flexible housing. The flexible connector is deformed when subjected to a force; at least one end of the flexible connector is connected to the massage component; and an outer periphery of the flexible connector and an outer periphery of the massage component are covered by the flexible housing.

12 Claims, 7 Drawing Sheets

(56) References Cited

U.S. PATENT DOCUMENTS

| | | | | |
|---|---|---|---|---|
| 2014/0228629 | A1* | 8/2014 | Baetica | A61H 23/00 600/38 |
| 2016/0000642 | A1* | 1/2016 | Zipper | A61H 19/34 600/38 |
| 2016/0045392 | A1* | 2/2016 | Massey | A61H 19/00 601/46 |
| 2017/0224580 | A1* | 8/2017 | Yueh | A61H 23/0254 |
| 2018/0042809 | A1* | 2/2018 | Zipper | A61H 19/44 |
| 2018/0193219 | A1* | 7/2018 | Hashimoto | A61H 7/005 |
| 2020/0085674 | A1* | 3/2020 | Haddock | A61H 21/00 |
| 2020/0237610 | A1* | 7/2020 | Courtion | A61H 23/004 |
| 2021/0393475 | A1* | 12/2021 | He | A61H 19/34 |
| 2022/0118245 | A1* | 4/2022 | Hvalsoe | A61N 1/0496 |
| 2023/0024137 | A1* | 1/2023 | Larkin | A61H 19/44 |
| 2023/0172793 | A1* | 6/2023 | Witt | A61H 9/0057 600/38 |
| 2023/0200514 | A1* | 6/2023 | Greiner-Perth | A61H 7/005 401/126 |
| 2023/0381060 | A1* | 11/2023 | Wersland | A61H 23/006 |
| 2024/0041692 | A1* | 2/2024 | Zhou | A61H 7/004 |

FOREIGN PATENT DOCUMENTS

| | | | | | |
|---|---|---|---|---|---|
| CN | 111904825 | A | * | 11/2020 | A61H 19/44 |
| CN | 212466550 | U | | 2/2021 | |
| CN | 214435308 | U | | 10/2021 | |
| CN | 215536428 | U | | 1/2022 | |
| CN | 215840305 | U | | 2/2022 | |
| CN | 115429644 | A | | 12/2022 | |
| KR | 20210126255 | A | | 10/2021 | |
| WO | WO-2011028576 | A2 | * | 3/2011 | A61H 19/30 |
| WO | WO-2022040263 | A1 | * | 2/2022 | A61H 19/44 |

OTHER PUBLICATIONS

International Search Report and Written Opinion issued in corresponding PCT Application No. PCT/CN2023/114851, dated Nov. 24, 2023.

* cited by examiner

TRANSFORMABLE MASSAGER

CROSS-REFERENCE TO RELATED APPLICATIONS

This application is a continuation application of International Application No. PCT/CN2023/114851, filed on Aug. 25, 2023, which claims priority to Chinese Patent Application No. 202311018325.8, filed on Aug. 11, 2023. The disclosures of the above-mentioned applications are incorporated herein by reference in their entireties.

TECHNICAL FIELD

The present application relates to the technical field of massage devices, and in particular to a transformable massager.

BACKGROUND

With the continuous improvement of people's living standards, people's health awareness has been greatly improved, and more and more health massage products have been in a wider application. One of the massagers works on the skin and muscle tissue of the human body, such as vibration, tapping, and other methods for massage.

In the related art, massagers are usually non-bendable and need to be held by hand during massage, which easily causes fatigue and is inconvenient to use.

SUMMARY

The main objective of the present application is to provide a transformable massager, which aims at solving the problem that the massager is inconvenient to use.

According to a first aspect of the present application, the embodiments of the present application provide a transformable massager including a flexible connector: a massage component: and a flexible housing, the flexible connector is deformed when subjected to a force: at least one end of the flexible connector is connected to the massage component: and an outer periphery of the flexible connector and an outer periphery of the massage component are covered by the flexible housing.

In the present application, by providing a flexible connector, when the user needs massage, the flexible connector can be deformed by force to achieve clamping, and the massage component can be used to massage the massaging part. The transformable massager can easily adapt to the massage requirement of different parts. At the same time, the present application can also perform massage when the flexible connector is not bent. By providing the flexible connector, the present application realizes the flexible selection of multiple massage methods, and achieves the purpose of wearing the transformable massager on the massaging part, which is convenient to use. The flexible housing of the present application can not only ensure that the transformable massager can be deformed, but also improve the massage comfort. At the same time, the transformable massager is easy to store.

BRIEF DESCRIPTION OF THE DRAWINGS

In order to more clearly illustrate the technical solutions in the embodiments of the present application or in the related art, drawings used in the embodiments or in the related art will be briefly described below. Obviously, the drawings in the following description are only some embodiments of the present application. It will be apparent to those skilled in the art that other figures can be obtained according to the structures shown in the drawings without creative work.

DETAILED DESCRIPTION OF THE EMBODIMENTS

Figure 1:
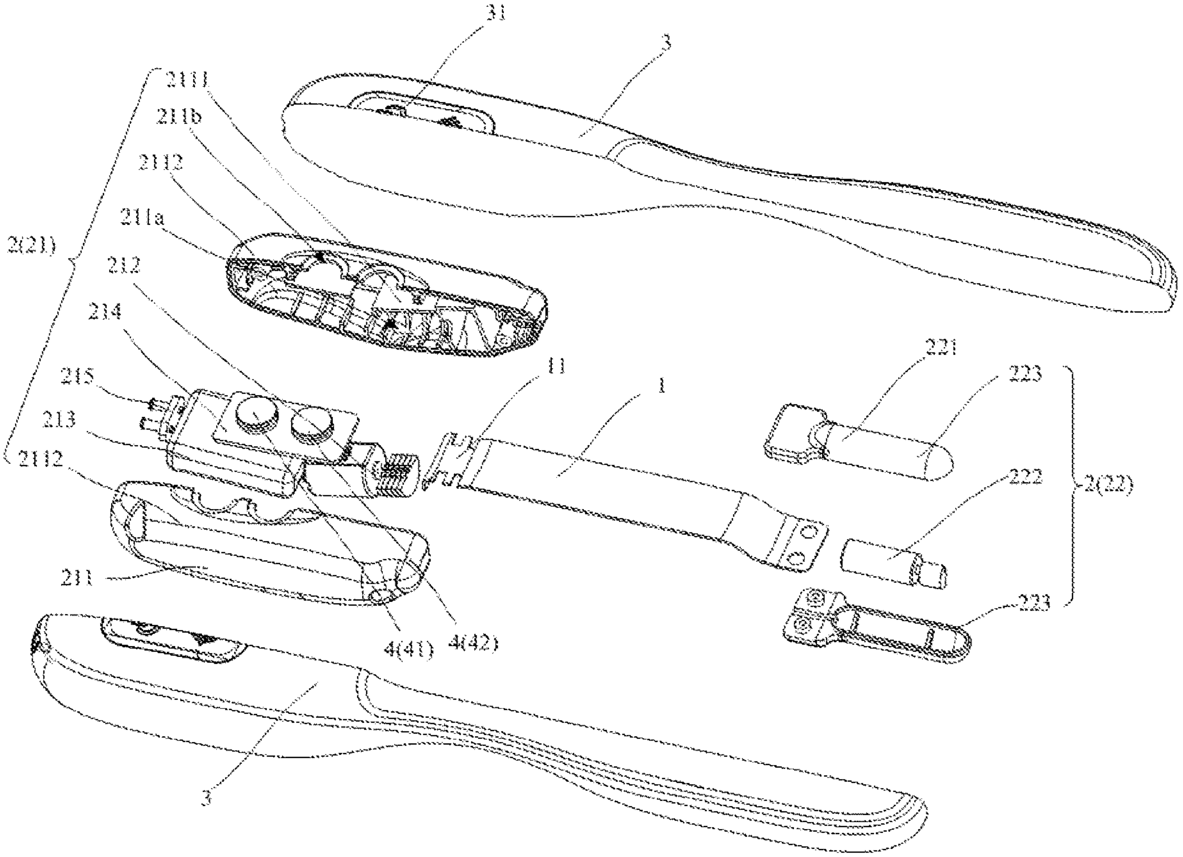
FIG. 1 a schematic exploded view of the transformable massager according to an embodiment of the present application.

The technical solutions in the embodiments of the present application will be clearly and completely described below with reference to the drawings in the embodiment of the present application. Obviously, the described embodiments are only a part of the embodiments of the present application, not all of the embodiments. Based on the embodiments in the present application, all other embodiments perceived by those ordinary skills in the art without creative effort should be fallen within the protection scope of the present application.

It should be noted that all of the directional instructions in the embodiments of the present application (such as, up, down, left, right, front, rear . . . ) are only used to explain the relative position relationship and movement of each component under a specific attitude (as shown in the drawings), if the specific attitude changes, the directional instructions will change correspondingly.

Besides, the descriptions in the present application that refer to "first," "second," etc. are only for descriptive purposes and are not to be interpreted as indicating or implying relative importance or to implicitly indicate the number of technical features indicated. Thus, a feature defined as "first" or "second" may explicitly or implicitly include at least one of the feature. In addition, the meaning of "and/or" appearing in the entire text is to include three parallel solutions. For example, "A and/or B" includes only A, or only B, or both A and B. In addition, technical solutions between the embodiments can be combined with each other, but must be based on the realization of the technical solutions by those skilled in the art, and when the technical solutions are contradictory to each other or cannot be realized, the technical solutions should be considered that the combination does not exist, and the technical solutions are not fallen within the protection scope claimed in the present application.

The present application provides a transformable massager that can be used to massage human body parts such as hands, legs, waist, neck, head, genitals, etc.

In the embodiment of the present application, as shown in FIG. 1, the transformable massager includes a flexible connector 1, a massage component 2 and a flexible housing 3. The flexible connector 1 will bend when subjected to force: at least one end of the flexible connector 1 is connected to the massage component 2: and an outer periphery of the flexible connector 1 and an outer periphery of the massaging component 2 are covered by the flexible housing 3.

It can be understood that by providing the flexible connector 1, when the user needs massage, the flexible connector 1 can be clamped by deforming the force, and the massaging part can be massaged through the massage component 2. The transformable massager can easily adapt to the massage needs of different parts. At the same time, the present application can also perform massage when the flexible connector 2 is not bent. By providing the flexible connector 2, the present application realizes the flexible selection of multiple massage methods and achieves the purpose of wearing the transformable massager on the massaging part, which is easy to use. The flexible housing 3 adopted in the present application can not only ensure that the transformable massager can be deformed, but also improve the massage comfort. At the same time, the transformable massager is easy to store.

The massage component can perform vibration massage, swing massage, rotating bead massage or tapping massage.

The flexible connector 1 can take any one of the following shapes: L, U, S, Z, J, V, C, P, X and Ɣ after deformation. The deformed shape of the flexible connector 1 can be changed by the user according to the usage scenario.

Figure 6:
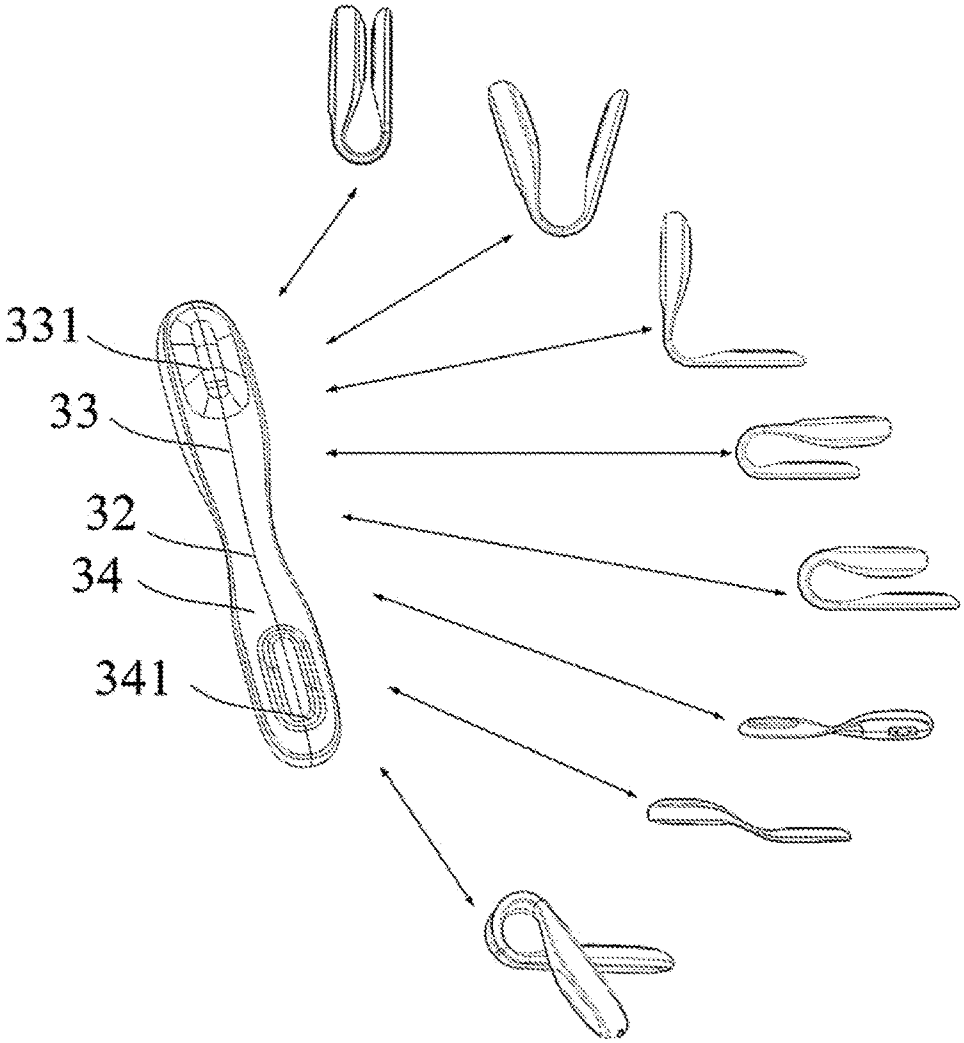
FIG. 6 is a schematic structural view of a second side of the flexible housing of the transformable massager according to an embodiment of the present application, showing a plurality of forms of the transformable massager.
Figure 7:
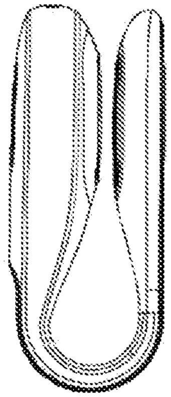
FIG. 7 to FIG. 14 respectively show the deformed form in FIG. 6.
Figure 8:
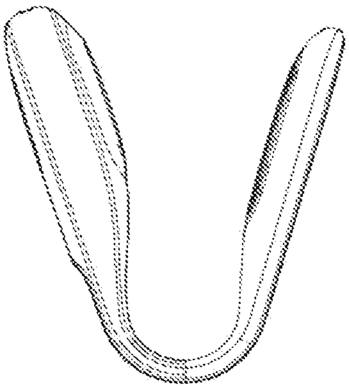
Figure 9:
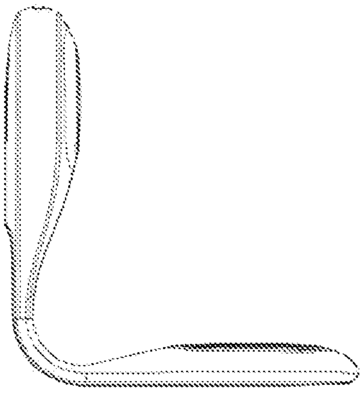
Figure 10:
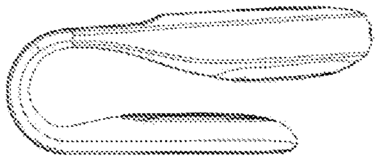
Figure 11:
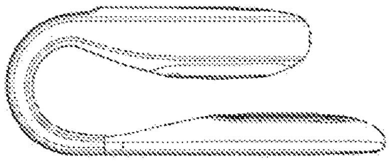
Figure 12:
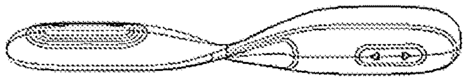
Figure 13:
Figure 14:
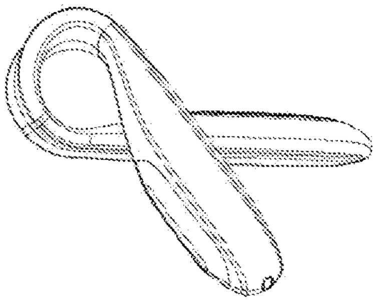

As shown in FIG. 7 to FIG. 14, various forms of deformation of the transformable massager of the present application are shown after the flexible connector 1 is deformed. FIG. 7, FIG. 10 and FIG. 11 are U-shaped, FIG. 8 is V-shaped, FIG. 9 is L-shaped, FIG. 12 is X-shaped, FIG. 13 is Z-shaped, and FIG. 14 is Ɣ shaped. Specifically, the transformable massager can be deformed from the straight state shown in FIG. 6 to any state shown in FIGS. 7 to 14. The transformable massager can also be restored from any state shown in FIGS. 7 to 14 to the straight state shown in FIG. 6, and can also be deformed from any one of the states in FIGS. 7 to 14 to any other state in FIGS. 7 to 14.

It should be noted that the deformed form of the flexible connector 1 is not limited to the forms listed above.

In an embodiment, the flexible connector 1 is a memory metal elastic piece.

It can be understood that the use of memory metal spring material can achieve the purpose of rapid bending and deformation of the flexible connector 1. For example, when the wrist needs to massage, the transformable massager can be held with one hand, tap the flexible connector 1 on a position corresponding to the wrist to bend the flexible connector 1, and release at the same time, the whole transformable massager is clamped to the wrist. For another example, when the neck needs to massage, the two ends of the transformable massager can be held with both hands, and then apply force with both hands to make the flexible connector 1 fully formed, and then let go, and the transformable massager can automatically clamp on neck. When the transformable massager needs to be restored to its original state (straight state), just apply a force opposite to the bending direction. Under the effect the memory performance of the flexible connector 1, the flexible connector 1 quickly returns to the straight state, so that the transformable massager can quickly return to its original state. The massager of the present application that adopts memory metal shrapnel as the flexible connector 1 is particularly suitable for massaging the genitals. Taking the male genitals as an example, the flexible connector 1 allows the massager to be clamped on the male genitals, with the massage effect of the massage component 2, as the size of the male genitals increases, the flexible connector 1 will deform (the curvature gradually decreases) accordingly. During this process, under the action of the flexible connector 1, the massager can be stably held at the massaging part.

Furthermore, adopting the memory metal elastic pieces, when the bending angle of the flexible connector 1 is less than the angle threshold, the flexible connector 1 will always automatically maintain a bent state to stably clamp the massaging part. When the bending angle of the flexible connector 1 is bent to exceed the angle threshold, the flexible connector 1 automatically and quickly returns to a straight state and remains straight. That is, the flexible connector 1 enables the massager to achieve an effect of "straightening without retraction, and non-straightening with retraction". In an embodiment, the angle threshold is 160°, in other embodiments, the angle threshold can also be other angle values. The angle threshold is a value less than 180° and can be affected by the material, thickness, width and length of the flexible connector.

In other embodiments, the flexible connector 1 may also be made of other deformable materials. Materials that can deform under force are within the protection scope of the present application and will not be described again here.

In an embodiment, the flexible housing 3 is made of silicone.

It can be understood that, silicone is soft and safe, which improves massage comfort while ensuring to be harmless to skin contact.

It should be noted that, in other embodiments, the material of the flexible housing 3 can also be made of plastic PVC or other materials. Non-rigid materials are all within the protection scope of the present application, and will not be described again here.

In an embodiment of the present application, the massage component includes a massage piece and a control panel. The massage piece is provided in the flexible housing: the control panel is electrically connected to the massage piece to control the start or stop of the massage piece through the control panel.

For different massage forms, the massage piece can adopt different massage structures. For example, the massage piece can adopt a vibration motor to drive the flexible housing to achieve a vibration massage effect, or a tapping structure to drive the flexible housing to achieve a tapping massage effect.

The working status of the massage component is controlled through the control panel, which can be controlled by mechanical buttons or wireless control such as remote control or APP control.

In an embodiment of the present application, the massage component further includes a shell, the shell is provided with an accommodation cavity, and the control panel and the massage piece are provided in the accommodation cavity. In this embodiment, the control panel and the massage piece are limited inside the shell.

It can be understood that covering the control panel and the massage component by the shell can, on the one hand, fix the control panel and the massage component, and on the other hand, facilitate the installation of the flexible housing and reduce the difficulty of manufacturing the flexible housing.

In an embodiment of the present application, the massage component further includes a power supply piece, which is provided in the accommodation cavity or outside the accommodation cavity or outside the flexible housing: and the power supply piece is electrically connected to the control panel.

The power supply piece can be directly provided in the accommodation cavity and connected to the control panel, or an external power supply piece can be adopted to be provided outside the flexible housing. When needed to use, the power supply piece is electrically connected to the control panel of the massager.

Figure 2:
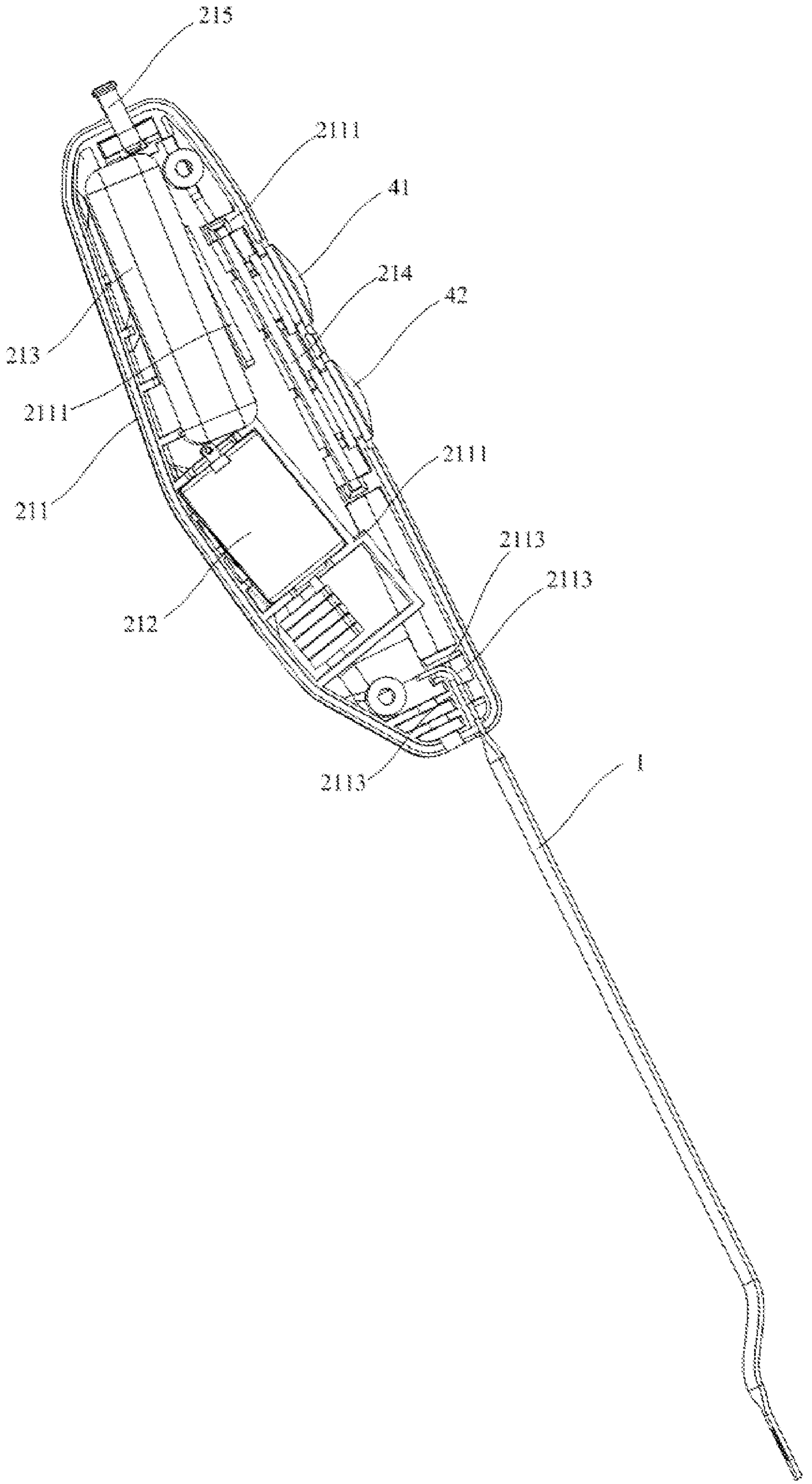
FIG. 2 is schematic structural view of a first massage component and a flexible connector of FIG. 1.
Figure 3:
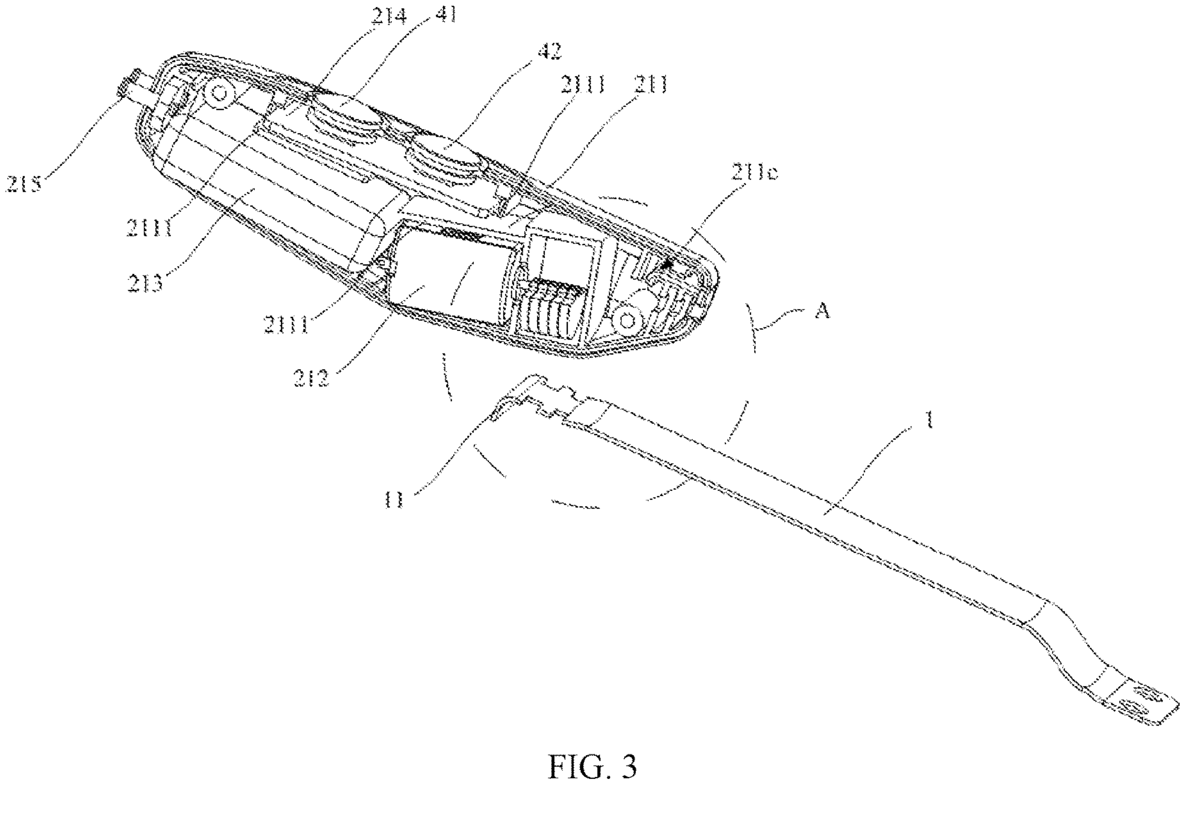
FIG. 3 is a schematic exploded view of FIG. 2.

In an embodiment of the present application, as shown in FIGS. 1, 2 and 3, a first massage component 21 is connected to one end of the flexible connector 1 and a second massage component 22 is connected to another end of the flexible connector 1. The first massage component 21 includes a first shell 211, a first massage piece 212, a power supply piece 213 and a control panel 214. The first shell 211 is provided with a first accommodation cavity: the first shell 211 is connected to the flexible connector 1: the first massage piece 212 is provided in the first accommodation cavity: the power supply piece 213 is provided in the first accommodation cavity: The control panel 214 is provided in the first accommodation cavity: the first massage piece 212 and the power supply piece 213 are electrically connected to the control panel 214 respectively.

The second massage component 22 includes a second shell 221 and a second massage piece 222. The second shell 221 is connected to the flexible connector 1; the second shell 221 is provided with a second accommodation cavity: and the second massage piece 222 is disposed in the second accommodation cavity and is electrically connected to the power supply piece 213 and the control panel 214.

In an embodiment, the first massage piece adopts a vibration motor, and the second massage piece adopts a vibration motor, which are connected to the massage components 2 at both ends of the flexible connector 1. When the user needs to massage, the flexible connector 1 can be bent through external force to drive the two massage components 2 to move and be clamped on the part to be massaged, so that they are not easy to break away. The first massage piece and the second massage piece vibrate to drive the flexible housing to vibrate to massage the massaging part. Moreover, the bending of the flexible connector 1 makes the clamping of the two massage components 2 more powerful, so that the massage components 2 can have a stronger massage effect on the human body when they vibrate.

It can be understood that the power supply piece 213 provides power 213 for the first massage piece 212 and the second massage component 22, and controls the first massage piece 212 and the second massage component 22 through the control panel 214. The first massage piece 212 and the second massage piece 222 are controlled by the same power supply piece 213 and the same control panel 214, which can reduce the volume and weight of the transformable massager.

It should be noted that in other embodiments, the first massage component 21 includes a first shell 211, a first massage piece 212, a first power supply piece and a first control panel. The first massage piece 212 and the first power supply piece are electrically connected to the first control panel respectively. The second massage component 22 includes a second shell 221, a second massage piece 222, a second power supply piece and a second control panel. The second massage piece 222 and the second power supply piece are electrically connected to the first control panel respectively. That is, the two massage components 2 are controlled respectively and operate independently.

In an embodiment, the power supply piece 213 is a rechargeable battery, as shown in FIGS. 1, 2 and 3. The transformable massager further includes a charging piece 215, and the charging piece 215 is connected to the power supply 213. In an embodiment, the charging piece 215 is a magnetic charging connector. In another embodiment, the charging piece 215 may also be a USB connector. It should be noted that the charging piece 215 in the present application can further be other forms of charging connectors, which will not be described again.

In an embodiment of the present application, as shown in FIGS. 1, 2 and 3, the cavity wall of the first accommodation cavity is provided with a plurality of first convex ribs 2111, and the plurality of first convex ribs 2111 are enclosed to form a plurality of limiting cavities 211*a*, and the first massage piece 212, the power supply piece 213, and the control panel 214 are respectively limited in the limiting cavities 211*a*.

It can be understood that the first massage piece 212, the power supply piece 213, and the control panel 214 are respectively limited and fixed through the limiting cavity 211*a* to avoid shaking and improve stability.

In an embodiment of the present application, as shown in FIGS. 1, 2 and 3, the first shell 211 is provided with a button hole 211*b* communicated with the first accommodation cavity, buttons 4 are inserted through each button hole 211*b*, and the control panel 214 is provided corresponding to the button hole 211*b* and connected to the button 4.

In an embodiment, the first shell 211 is provided with two button holes 211*b*, and the two button holes 4 are respectively provided with a switch button 41 and a gear button 42. The switch button 41 is configured to control the on and off of the power supply piece 213, and the gear button 42 is configured to control the working gears of the first massage piece 212 and the second massage piece 222. Different working gears correspond to different massage intensities.

It can be understood that by providing the button 4, the user can directly control the massage process by operating the button 4, the operation is simple and it is easy to use. In an embodiment, the control of vibration intensity by the gear button 42 can be selected by the times of pressing the gear button 42. For example, when the gear button 42 is pressed once, the vibration intensity of the first massage piece 212 and the second massage piece 222 is weak: when the gear button 42 is pressed twice, the vibration intensity of the first massage piece 212 and the second massage piece 222 is medium: when press the gear button 42 three times, the vibration intensity of the first massage piece 212 and the second massage piece 222 is strong.

Figure 5:
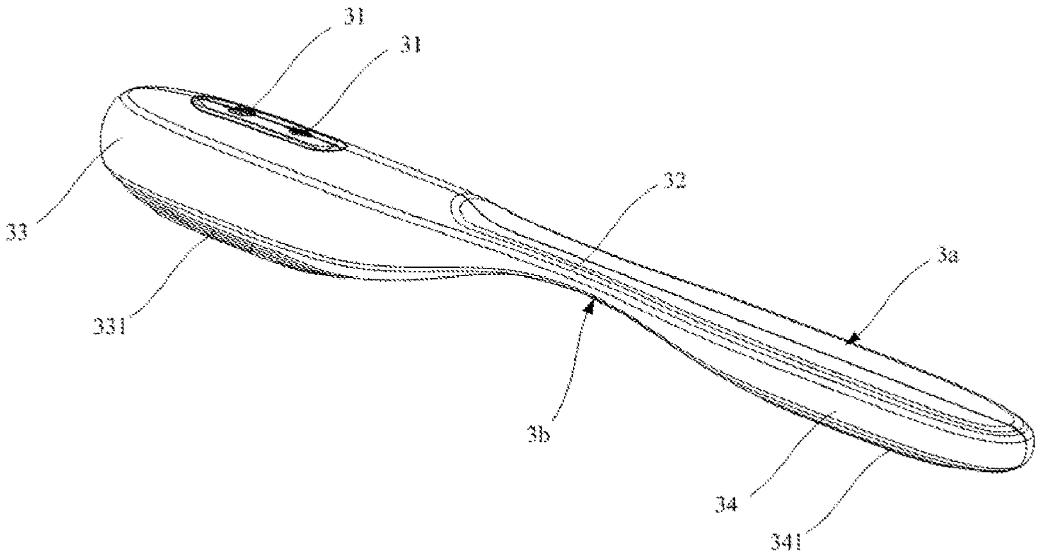
FIG. 5 is a schematic structural view of a flexible housing of the transformable massager according to an embodiment of the present application.

In an embodiment of the present application, as shown in FIGS. 1 and 5, the button 4 corresponding to the flexible housing 3 is provided with a button mark 31.

It can be understood that the button mark 31 serves as an intuitive prompt, and the user can perform different operations according to the corresponding button marks 31. For example, the switch button 41 marked 31 corresponds to the switch button 41, and the position where the switch button 41 marked 31 can be pressed to achieve the purpose of pressing the switch button 4, which can control the power supply 213 to be turned on and off.

In another embodiment, buttons may not be provided, the opening and closing of the first massage piece 212 and the second massage piece 222 may be controlled wirelessly, and the working gear of the massager may be controlled wirelessly. For example, the wireless method can be controlled by infrared remote control or APP control. In an embodiment without providing the buttons, in order to facilitate visual observation, an indicator light may also be provided on the flexible housing to visually indicate the working status of the massager.

In an embodiment of the present application, as shown in FIG. 1, the first shell 211 includes two first half shells 2112, and the two first half shells 2112 are detachably connected and enclosed to form the first accommodation cavity.

It can be understood that configuring the first shell 211 as two first half shells 2112 detachably connected can facilitate the installation and replacement of components in the first accommodation cavity.

In an embodiment, a positioning groove is provided on the peripheral edge of one side of the first half shell 2112 facing the other first half shell 2112, and a positioning protrusion is provided on the peripheral edge of the other half shell, and the positioning protrusion is inserted into the positioning groove. The quick-positioning of the two first half shells 2112 can be realized through the cooperation of the positioning protrusion and the positioning groove, thereby improving the assembly efficiency.

In an embodiment of the present application, as shown in FIG. 1, the second shell 221 includes two second half shells 223, and the two second half shells 223 are detachably connected and enclosed to form the second accommodation cavity.

In an embodiment, one end of the flexible connector 1 close to the second shell 221 is clamped between the two second half-housings 223 and is provided with an installation through hole. One second half-housing 223 is provided with a snapping protrusion. The other second half-housing 223 is provided with a snapping groove, and the snapping protrusion is passed through the installation through hole and inserted into the snapping groove to realize snap-fitting of the two half shells.

In an embodiment of the present application, as shown in FIGS. 2 and 3, one end of the flexible connector 1 is provided with a first snapping piece 11, and the first snapping piece 11 is inserted through the first shell 211, so that the flexible connector 1 and the first shell 211 can be detachably connected. It can be understood that connecting through snap connections can increase assembly speed and facilitate disassembly.

In an embodiment, the first clamping component 11 and the flexible connecting component 1 have an integrally formed structure.

Figure 4:
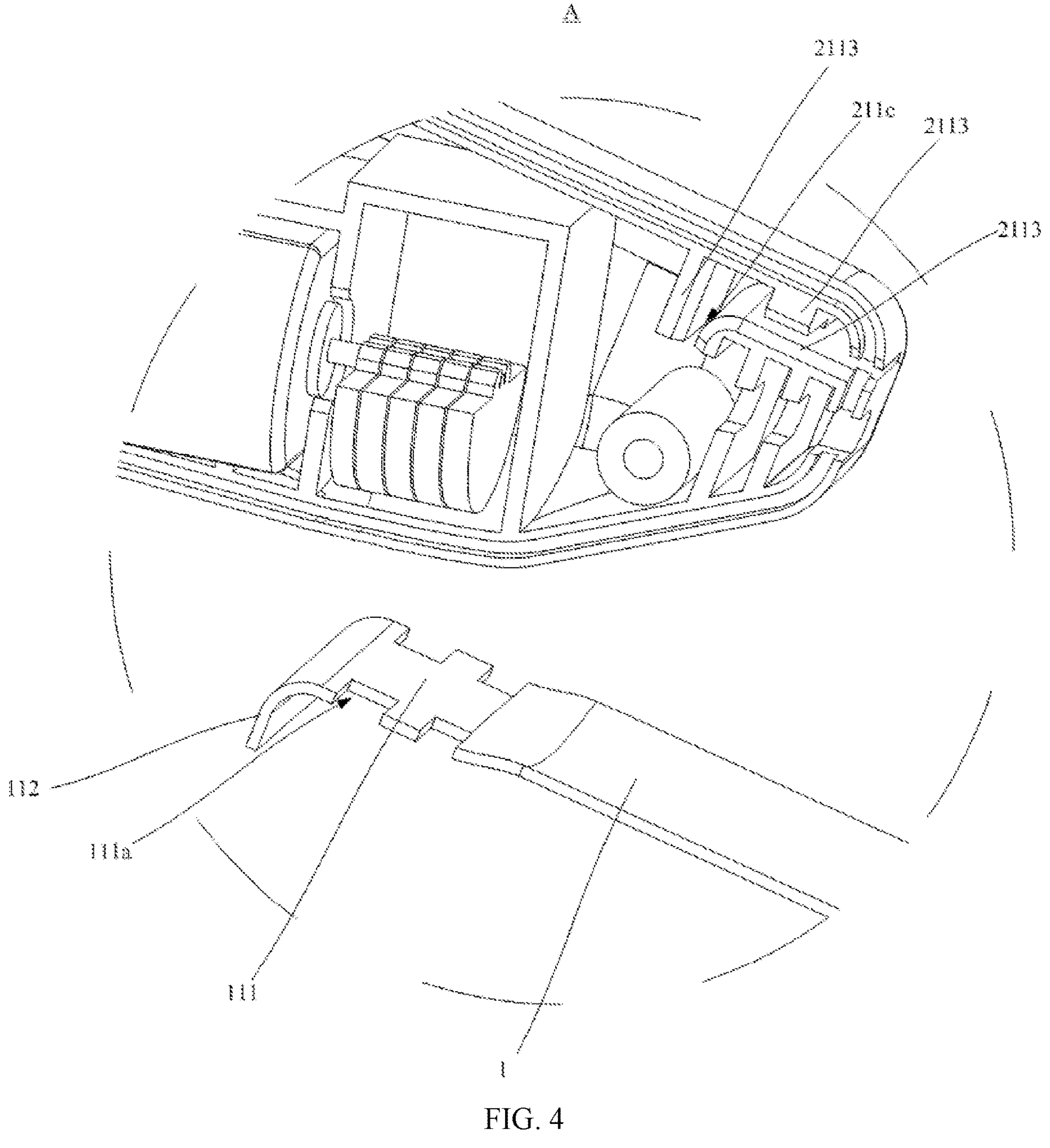
FIG. 4 is an enlarged view of A in FIG. 3.

In an embodiment, as shown in FIGS. 2, 3 and 4, the cavity wall of the first accommodation cavity is provided with a plurality of second convex ribs 2113, and the second convex ribs 2113 enclose a snapping cavity 211*c*., the snapping cavity 211*c* is L-shaped.

The first snapping part 112 includes a limiting part 111 and a snapping part 112. The limiting part 111 is connected to the flexible connector 1. The limiting grooves 111*a* are provided on both sides of the limiting part 111. The second protruding rib 2113 is inserted into the limiting groove 111*a*: the snapping part 112 is connected to an end of the limiting part 111 away from the flexible connector 1, and the snapping part 112 is connected to the flexible connector 1. The limiting part 111 is connected at an angle to form an L-shaped structure adapted to the snapping cavity 211*c*. The snapping part 112 and the limiting part 111 are limited in the snapping cavity 211*c*.

It can be understood that, through the cooperation of the limiting groove 111*a* and the second rib 2113, the limiting part 111 can play a limiting role, that is, the first snapping part 112 can play a limiting role, thereby limiting the flexible connector 1, and improving connection stability. The snapping part 112 and the limiting part 111 are connected at an included angle to form an L-shaped structure adapted to the snapping cavity 211*c*, thereby further limiting flexible connector 1.

It should be noted that in the other embodiment, the snapping cavity 211*c* can also be designed in other shapes, such as O, V, P, U, T, etc., and the first snapping piece 112 is adapted to the shape of the snapping cavity 211*c*.

In an embodiment of the present application, as shown in FIGS. 5 and 6, the flexible housing 3 includes a bending part 32, a first massage part 33 and a second massage part 34. The outer periphery of the flexible connector 1 is covered by the bending part 32: the outer periphery of the first shell 211 is covered by the first massage part 33: the first massage part 33 corresponding to the first massage piece 212 is provided with a first massage protrusion. The outer periphery of the second shell 221 is covered by the second massage part 34: the second massage part 34 corresponding to the second massage piece 222 is provided with a second massage protrusion 341.

The circumferential dimension of the bending part 32 is smaller than the circumferential dimension of the first massaging part 33, and the circumferential dimension of the bending part 32 is smaller than the circumferential dimension of the second massage part 34. The two ends of the bent part 32 are respectively connected to the first massage part 33 and the second massage part 34, and the connection is in a smooth transition.

It can be understood that providing the first massage protrusion 331 on the first massage part 33 and the second massage protrusion 341 on the second massage part 34 can enhance the massage effect.

The circumferential dimension of the bending part 32 is smaller than the circumferential dimension of the first massage part 33 and the second massage part 34, so that the bending part 32 can be easily bent. Furthermore, when the user massages the genitals, for the sake of safety and health, the user can put a condom on the second massage part 34 or the first massage part 331, and the elastic clamp ring of the condom is clamped on the bending part 32. Since the dimension of the bending part 32 is the smallest, the stability of the connection between the condom and the massager can be improved and the risk of the condom falling off can be reduced.

Both ends of the bending part 32 smoothly transition to the first massage part 33 and the second massage part 34 respectively, which can not only beautify the appearance but can also improve comfort when the bending part 32 fits the human body.

In an embodiment of the present application, as shown in FIGS. 5 and 6, the flexible housing 3 has a first side 3*a* and a second side 3*b* that are away from each other, and the second side 3*b* is provided with the first massage protrusion 331 and the second massage protrusion 341.

The first side 3*a* of the bending part 32 is flat, the first side 3*a* of the first massage part 33 is provided with a button mark 31, and the end of the bending part 32 close to the first massage part 33 faces toward a direction away from the first shell 211 and extends to be connected to the first side 3*a* of the first massage part 33. The first side 3*a* of the second massage part 34 is flat, and the first side 3*a* of the bending part 32 and the second side 3*b* of the second massage part 34 is on the same plane.

The second side 3*b* of the bending part 32 is arc-shaped, and the two ends of the second side 3*b* of the bending part

32 smoothly transition to the second side 3*b* of the first massage part 33 and the second side 3*b* of the second massage part 34.

It can be understood that the button mark 31, the first massage protrusion 331 and the second massage protrusion 341 are provided on the first side 3*a* and the second side 3*b* that are away from each other, so that the button mark 31 is exposed after wearing the transformable massager, which is easy to operate. The curvature of the second side 3*b* of the flexible housing 3 is significantly larger than that of the first side 3*a*, which facilitates the user to correctly operate the bending direction.

The above are only some embodiments of the present application, and do not limit the scope of the present application thereto. Under the inventive concept of the present application, equivalent structural transformations made according to the description and drawings of the present application, or direct/indirect application in other related technical fields are included in the scope of the present application.

What is claimed is:

1. A transformable massager, comprising:

a flexible connector;

a massage component; and a flexible housing, wherein the flexible connector is deformed when subjected to a force;

at least one end of the flexible connector is connected to the massage component; and an outer periphery of the flexible connector and an outer periphery of the massage component are covered by the flexible housing, wherein the massage component comprises a first massage component and a second massage component;

the first massage component is connected to one end of the flexible connector and the second massage component is connected to another end of the flexible connector;

the first massage component comprises a first shell, a first massage piece, a power supply piece and a control panel, the first shell is provided with a first accommodation cavity; the first shell is connected to the flexible connector; the first massage piece, the power supply piece, and the control panel are respectively provided in the first accommodation cavity; the first massage piece, the power supply piece, and the second massage component are electrically connected to the control panel;

the second massage component comprises a second shell and a second massage piece, the second shell is connected to the flexible connector; the second shell is provided with a second accommodation cavity; and the second massage piece is provided in the second accommodation cavity and is electrically connected to the power supply piece and the control panel;

a first snapping piece is provided at one end of the flexible connector, the first snapping piece is inserted through the first shell, and the flexible connector is detachably connected to the first shell.

2. The transformable massager according to claim 1, wherein the flexible connector is a memory metal elastic piece.

3. The transformable massager according to claim 1, wherein the flexible connector is deformed into any shape of L, U, S, Z, J, V, C, P, X and Y.

4. The transformable massager according to claim 1, wherein the flexible housing is made of silicone.

5. The transformable massager according to claim 1, wherein the massage component comprises:

the first massage piece and the second massage piece are provided in the flexible housing; and the control panel electrically connected to the first massage piece and the second massage piece to control a start or stop of the first massage piece and the second massage piece through the control panel.

6. The transformable massager according to claim 1, wherein a wall of the first accommodation cavity is provided with a first convex rib, the first convex rib forms a plurality of limiting cavities, and the first massage piece, the power supply piece, and the control panel are respectively limited in the limiting cavities.

7. The transformable massager according to claim 1, wherein the first shell is provided with a plurality of button holes communicated with the first accommodation cavity, buttons are inserted through the button holes respectively, and the control panel is provided corresponding to the button holes and connected to the buttons.

8. The transformable massager according to claim 7, wherein the buttons corresponding to the flexible housing are provided with at least one button mark.

9. The transformable massager according to claim 7, wherein the first shell is provided with two button holes, the two button holes are respectively provided with a switch button and a gear button, the switch button is configured to control on and off of the power supply piece, and the gear button is configured to control working gears of the first massage piece and the second massage piece.

10. The transformable massager according to claim 1, wherein the wall of the first accommodation cavity is provided with a second convex rib, the second convex rib is formed to a snapping cavity, and the snapping cavity is in an L-shape;

a first snapping part comprises:

a limiting part connected to the flexible connector, wherein two sides of the limiting part are provided with limiting grooves, and the limiting grooves are inserted with the second rib; and a snapping part connected to an end of the limiting part away from the flexible connector, wherein the snapping part and the limiting part are connected in an angle to form an L-shape structure fitting to the snapping cavity, and the snapping part and the limiting part are limited in the snapping cavity.

11. The transformable massager according to claim 1, wherein the flexible housing comprises:

a bending part, wherein the outer periphery of the flexible connector is covered by the bending part;

a first massage part, wherein the outer periphery of the first shell is covered by the first massage part; the first massage part corresponding to the first massage piece is provided with a first massage protrusion; and a second massage part, wherein the outer periphery of the second shell is covered by the second massage part; the second massage part corresponding to the second massage piece is provided with a second massage protrusion;

wherein, a circumferential dimension of the bending part is smaller than a circumferential dimension of the first massage part, and the circumferential dimension of the bending part is smaller than a circumferential dimension of the second massage part; two ends of the bending part are respectively connected to the first massage part and the second massage part, and a connection is in a smooth transition.

12. The transformable massager according to claim 11, wherein the flexible housing comprises a first side and a second side away from each other, and the second side is provided with the first massage protrusion and the second massage protrusion;

a first side of the bending part is flat, the first side of the first massage part is provided with a button mark;

the first side of the second massage part is flat, and the first side of the bending part and the second side of the second massage part is on the same plane; and the second side of the bending part is arc-shaped, and the two ends of the second side of the bending part smoothly transition to the second side of the first massage part and the second side of the second massage part.

* * * * *